(12) United States Patent
Cummings

(10) Patent No.: US 6,431,560 B2
(45) Date of Patent: Aug. 13, 2002

(54) BOARD ASSEMBLY FOR SLIDING ON GRASS SLOPES

(76) Inventor: Clark W. Cummings, 330 Fourth Street, New Westminster B.C. (CA), V3L 2V2

( * ) Notice: Subject to any disclaimer, the term of this patent is extended or adjusted under 35 U.S.C. 154(b) by 49 days.

(21) Appl. No.: 09/799,596

(22) Filed: Mar. 7, 2001

(30) Foreign Application Priority Data

Mar. 17, 2000 (CA) .............................................. 2300819

(51) Int. Cl.$^7$ ................................................ B62B 9/04
(52) U.S. Cl. .............................. 280/14.21; 280/14.27; 280/28
(58) Field of Search .............................. 280/845, 14.21, 280/14.22, 14.27, 14.28, 18, 18.1, 28

(56) References Cited

U.S. PATENT DOCUMENTS

| | | | | |
|---|---|---|---|---|
| 1,238,431 A | * | 8/1917 | Nylund | ..................... 280/14.21 |
| 3,442,522 A | * | 5/1969 | Spilhaus | ................... 280/11.18 |
| 3,606,366 A | * | 9/1971 | Engelberger | .................. 280/28 |
| 4,025,082 A | * | 5/1977 | Lummus | ................... 280/14.27 |
| 4,225,145 A | | 9/1980 | Carr | |
| 5,181,741 A | * | 1/1993 | Scheiman et al. | ............ 280/28 |
| 5,613,695 A | | 3/1997 | Yu | |
| 5,662,186 A | | 9/1997 | Welch | |
| 5,820,155 A | | 10/1998 | Brisco | |
| 5,865,446 A | | 2/1999 | Kobylenski et al. | |
| 5,941,540 A | | 8/1999 | O'Haire | |

\* cited by examiner

*Primary Examiner*—Michael Mar
(74) *Attorney, Agent, or Firm*—Frederick Kaufman

(57) ABSTRACT

The board assembly for sliding on grass slopes comprises a board, a retaining means attached to the board and a locking means for clamping an ice block to the retaining means. The board has, essentially, a rectangular shape with longitudinal and transversal axes of symmetry, upper and lower surfaces, a front and rear end and a pair of lateral ends. The retaining means is attached to the lower surface, has an axis of symmetry coinciding with the longitudinal axis of symmetry and is adaptable to capture an ice block. The locking means actuates on the retaining means for closing it and, thereby, clamping the ice block in place.

8 Claims, 5 Drawing Sheets

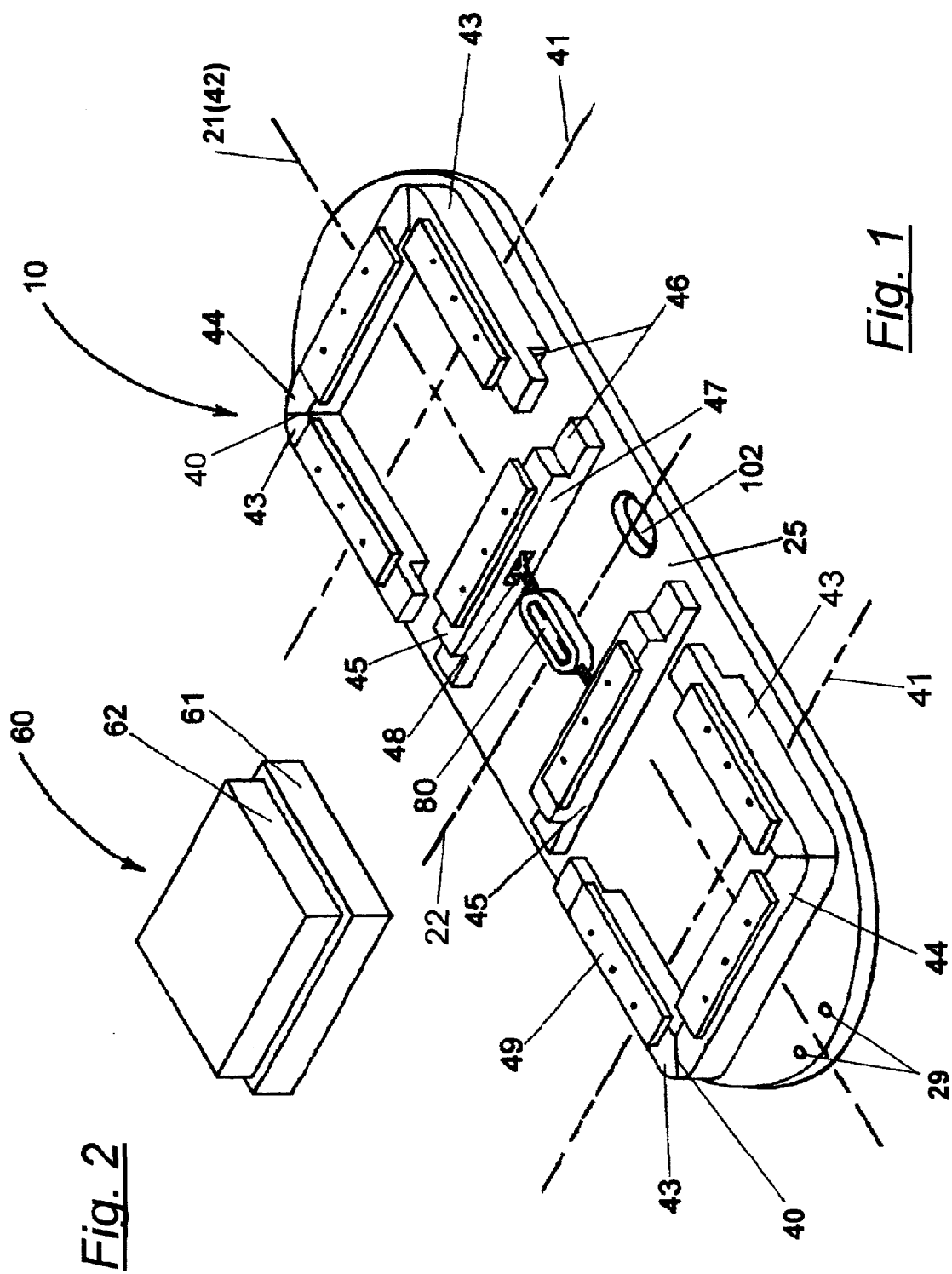

BOARD ASSEMBLY FOR SLIDING ON GRASS SLOPES

BACKGROUND OF THE INVENTION

1. Field of the Invention

The present invention refers in general to sliding boards and, more particularly, to a method for sliding on grass slopes and a board assembly therefor.

2. Description of the Prior Art

The sport of snowboarding has arisen as a popular winter sport, alternative to traditional skiing. The need to extend this widely liked sport, beyond the winter season, constitutes the determinant factor in developing the present invention.

The following disclosures relate to various types of known boards: O'Haire(U.S. Pat. No. 5,941,540 issued Aug. 24, 1999); Kobylenski et al.(U.S. Pat. No. 5,865.446 issued Feb. 2, 1999); Brisco (U.S. Pat. No. 5,820,155 issued Oct. 13, 1998); Yu (U.S. Pat. No. 5,613,695 issued Mar. 25, 1997); Csepregi (Canadian Patent Number 1,324,480 issued Nov. 9, 1993) and Elphick (Canadian Patent Application filed Oct. 11, 1990).

The inventor believes that the cited above disclosures, taken alone or in combination, neither anticipate nor render obvious the present invention, which has arisen to mitigate and/or obviate the disadvantages of the conventional boards. The foregoing citation of patents does not constitute an admission that such disclosures are relevant or material to the claimed subject matter. Rather, the disclosures relate only to the field of the invention and are cited as constituting the closest art of which the inventor is aware.

SUMMARY OF THE INVENTION

It is the primary objective of the present invention to provide a method and a board assembly suitable for sliding on grass slopes.

It is another objective of this invention to build a sturdy board assembly.

It is yet another objective of this invention to provide a well-engineered structure, which is also not expensive to manufacture.

Broadly stating, the board assembly for sliding on grass slopes comprises a board, a retaining means attached to the board and a locking means for clamping an ice block to the retaining means. The board has, essentially, a rectangular shape with longitudinal and transversal axes of symmetry, upper and lower surfaces, a front and rear end and a pair of lateral ends.

The retaining means is attached to the lower surface, has an axis of symmetry coinciding with the longitudinal axis of symmetry and is adaptable to capture an ice block.

The locking means actuates on the retaining means for closing it and, thereby, clamping the ice block in place.

In one aspect of the present invention, the board assembly for sliding on grass slopes comprises a board having essentially a rectangular shape with longitudinal and transversal axes of symmetry, which intersect in the center of symmetry of the board. The board has an upper surface, a lower surface, a front and rear end and a pair of retaining frames, each of rectangular in shape. Each retaining frame has a long axis of symmetry, parallel to the transversal axis and a short axis of symmetry that coincides with the longitudinal axis of symmetry, and a long element, parallel to the transversal axis of symmetry. The pair of parallel short elements and the long element are firmly secured to the lower surface. A removable long element, parallel to the long element is disposed near the transversal axis of symmetry and is adapted to fit with its opposite ends, using corner lap joints, in adjoining ends of the short elements. Each removable long element has a central recess located in the side directed towards the transversal axis of symmetry. On the top surface of each short, long and removable long element, a retainer is so secured, that it extends inwardly beyond the internal edge of each of the mentioned elements, to form a lip. The resulting lips form a substantial rectangular contour, which encompasses an open surface, which is less than the interior surface of the retaining frame.

A locking means actuates simultaneously for fixing in position or dismantling the removable long elements.

In another aspect of the present invention, the locking means includes a turnbuckle, internally threaded at both ends, one end being right hand threaded, the other— left hand threaded. In each of the ends is screwed a threaded, closed eye rod, which has an eye at one extremity and a thread at the other extremity. The eye is directed toward the recess of the removable long element. Rotating the turnbuckle in one direction results in tightening, in another direction— in slackening of the removable long element.

In one aspect, the above embodiment is provided with a pair of fixed loop handles, which are firmly secured on the upper surface of the board. Each fixed loop handle is disposed adjacent to a lateral end and is parallel to the longitudinal axis of symmetry and perpendicular to the transversal axis of symmetry.

In the last aspect of the above embodiment, a rope with a handle in the middle is attached by knots to a pair of holes, disposed approximate to the rear end. The holes are located parallel to the transversal axes of symmetry and perpendicular to the longitudinal axes of symmetry of the board.

In another embodiment, a unitary board having, essentially, a rectangular shape with longitudinal and transversal axes of symmetry, an upper and lower surface, a front and rear end and a pair of lateral ends. Front and rear ends are curvilinear and the transition between upper and lower surfaces, along the contour of the board, is rounded. A recess, starting from the lower surface and having, in the bottom view, essentially, a rectangular shape, basically extends over most of the area of the board. The axes of symmetry of the recess coincide with the longitudinal and transversal axes of symmetry of the unitary board. In each lateral surface of the pair of lateral ends, centrally located and starting from the recess, a rectangular entrance slit, parallel to the longitudinal axis of symmetry, is provided. The latter includes, at each end, an upper part of a corner lap joint.

Use is made of a pair of removable long elements. Each removable long element is adapted to fit, with its opposite ends, into adjoining ends of opposed rectangular entrance slits, thereby forming corner lap joints. Thus, two cavities adapted to capture ice blocks are formed. On the exterior surface of each of the four elements of the rectangular shape, which delimits each of the two cavities, a retainer is firmly secured.

An adjustable locking device, located between the opposed removable long elements, actuates simultaneously on the latter.

The method of sliding on grass slopes, using a board having an upper and lower surface and adaptable to use an ice block, according to the present invention, comprises the following steps:

providing the board;

attaching to the lower surface of the board at least one ice block;

putting the board on a grass slope; and riding the board.

BRIEF DESCRIPTION OF THE DRAWINGS

Although the characteristic features of the invention will be particularly pointed out in the claims, the invention itself, and the manner in which it may be made and used, may be better understood by referring to the following description taken in connection with the accompanying drawings, forming part thereof, wherein like reference numerals refer to like parts throughout the several views, in which:

FIG. 1 is a perspective view of a first embodiment of the board assembly of the present invention, viewed from the bottom and illustrating the retaining frames and the adjustable locking device;

FIG. 2 is a perspective view of an ice block;

DESCRIPTION OF THE PREFERRED EMBODIMENT

Figure 3:
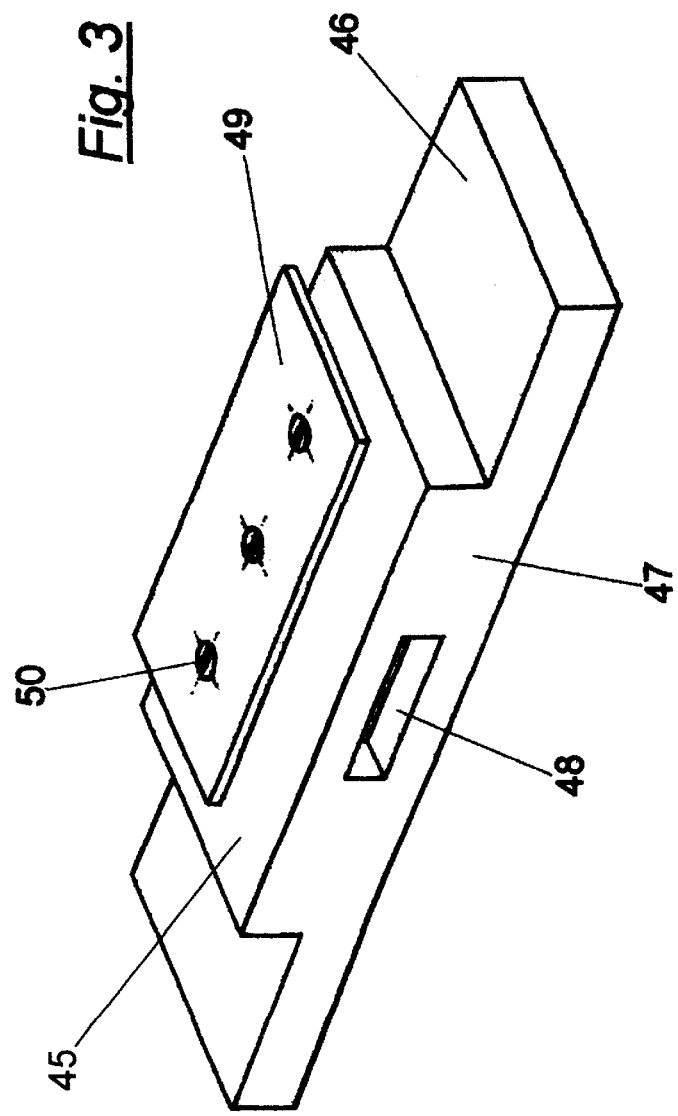
FIG. 3 is a perspective view of a removable long element.
Figure 4:
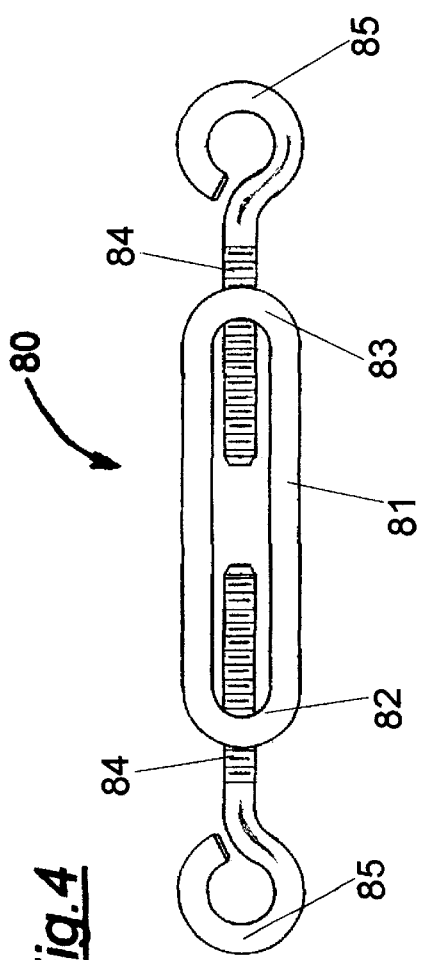
FIG. 4 is a perspective view of the adjusting locking device.
Figure 5:
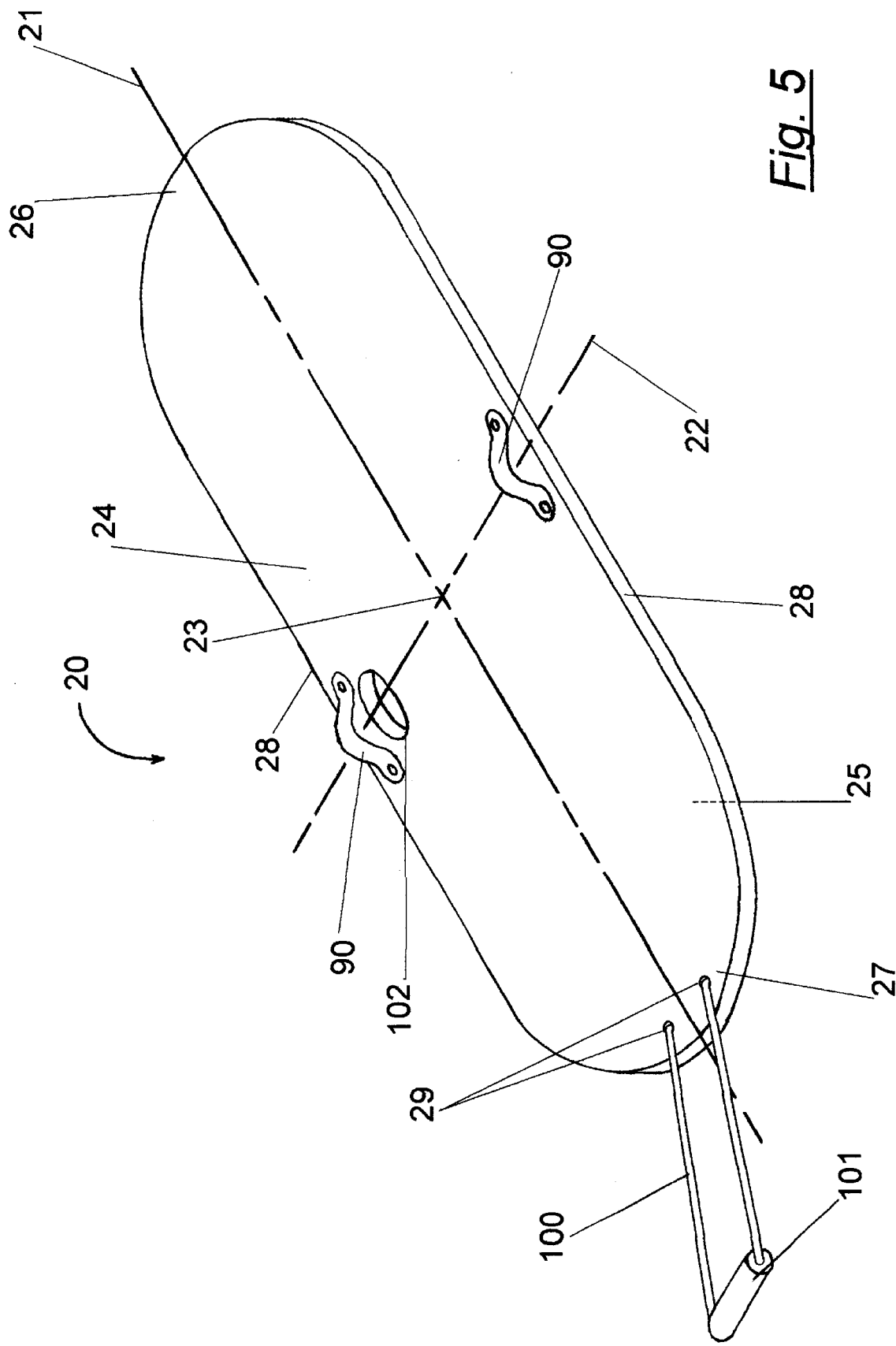
FIG. 5 is a perspective view of the board assembly viewed from the top.
Figure 6:
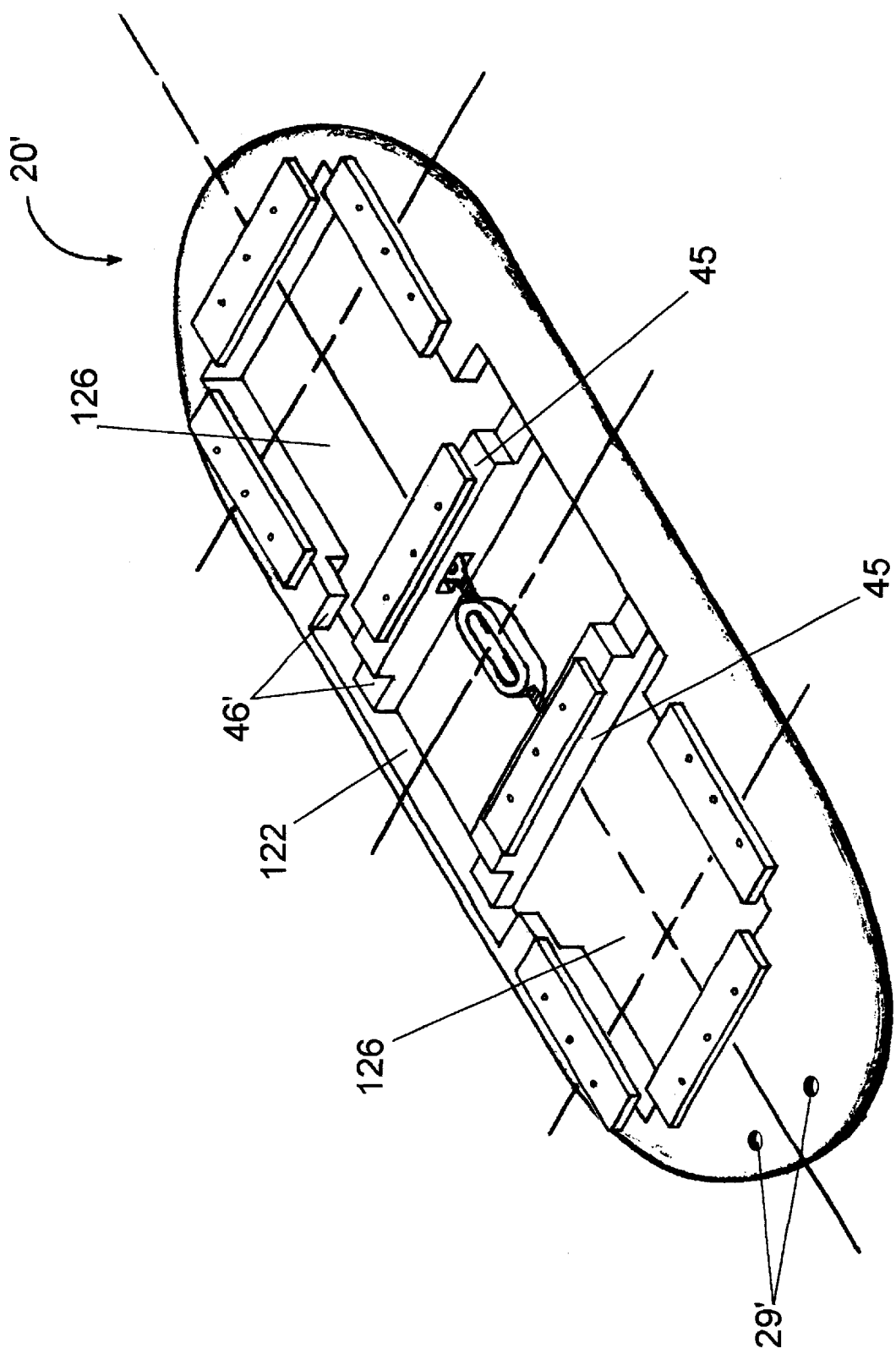
FIG. 6 is a perspective view of a second embodiment of the board assembly of the present invention.
Figure 7:
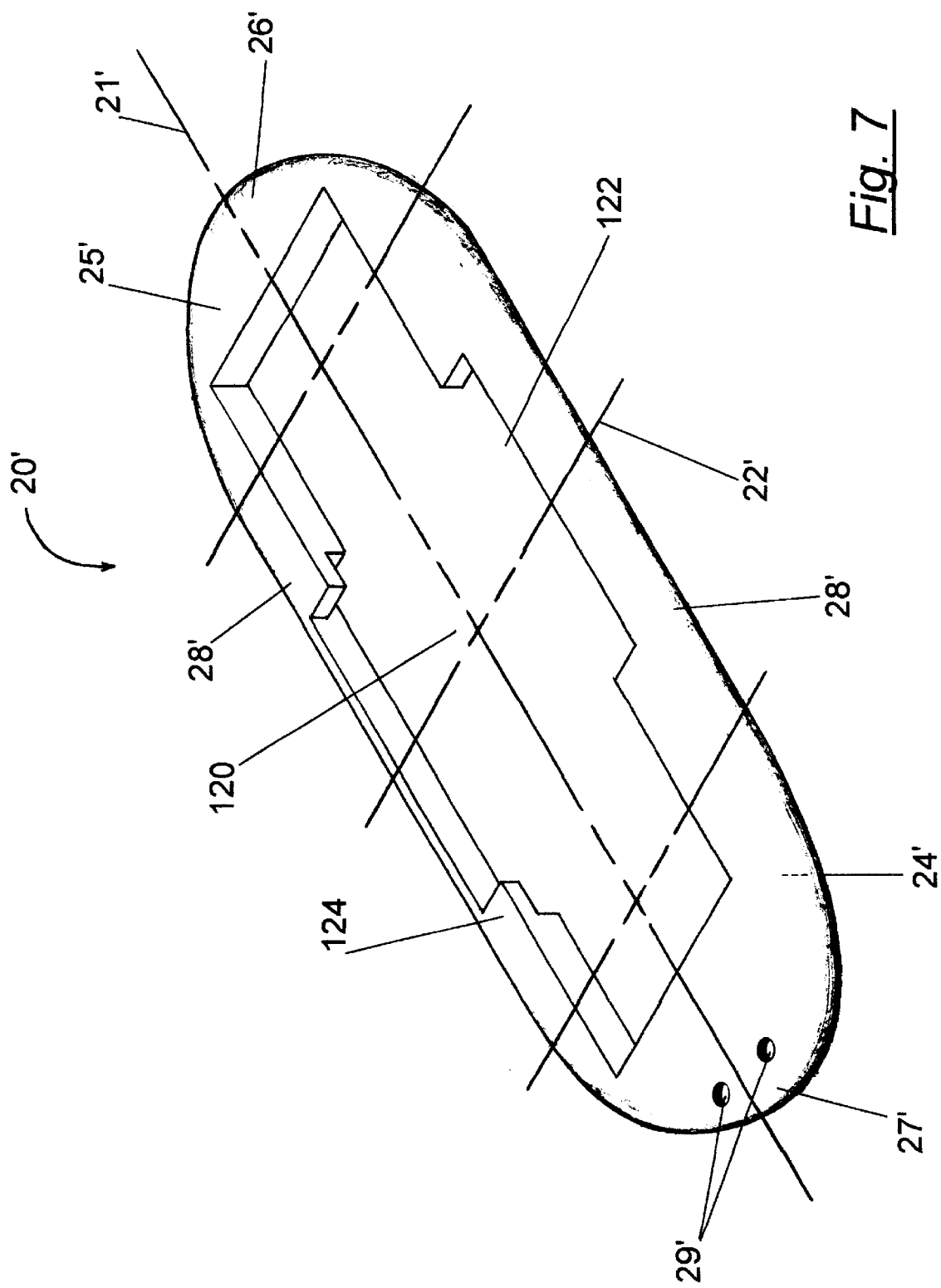
FIG. 7 is a perspective view of a unitary board according to the second embodiment.

Referring to the drawings, wherein like elements are indicated by like numerals, numeral 10 indicate, in general, a first embodiment of a board assembly for sliding on grass slopes. The latter, basically, comprises a board 20, which is similar to known snowboards, but has wider dimensions. To board 20 is attached a pair of retaining frames 40. Each retaining frame 40 is used for clamping an ice block 60. Board 20 is made in the usual way, in which similar boards are made and has, essentially, a rectangular shape with longitudinal and transversal axes of symmetry 21 and 22, respectively. The former and latter named axes intersect in a center of symmetry 23 of board 20 which has an upper surface 24, a lower surface 25, a front end 26, a rear end 27 and a pair of lateral ends 28. Front end 26 and rear end 27 are curvilinear. A pair of holes 29 is provided proximate to rear end 27 and disposed parallel to transversal axis of symmetry 22 and perpendicular to longitudinal axis of symmetry 21. The purpose of pair of holes 29 will be explained later in the present disclosure.

Each retaining frame 40 is made, preferably, from the same material as board 20, has essentially a rectangular shape and is located on lower surface 25 of board 20. Each retaining frame 40 has a long axis of symmetry 41, parallel to transversal axis of symmetry 22, and coincides with longitudinal axis of symmetry 21 of board 20. One of the pair of retaining frames 40 is proximate to front end 26, while the other one is proximate to the rear end 27. Each retaining frame 40 is formed from a pair of parallel short elements 43 parallel to said longitudinal axis of symmetry 21 and firmly secured with screws (not shown) to said lower surface 25. A long element 44 is also firmly secured with screws (not shown) to said lower surface 25 and disposed, respectively, near front and rear ends 26 and 27.

A removable long element 45, disposed adjacent to transversal axis of symmetry 22, is fitted with its opposite ends, by corner lap joints 46, in adjoining ends of short elements 43. Each removable long element 45 has a side 47, directed towards said center of symmetry 23, provided with a central recess 48. The latter has the form of an oblong, blind hole.

On the exterior top surface of each of short elements 43, long element 44 and removable long element 45 of each retaining frame 40, a retainer 49, made from a strip of rigid material, such as metal, is firmly fixed. All retainers 49 extend inwardly, beyond internal edges of the above elements (43,44 and 45), forming lips. These lips constitute a substantial rectangular contour, which encompasses an open surface, which is smaller than that formed by the elements of retaining frame 40.

An adjustable locking device 80, for fixing in position said removable long elements 45, includes a turnbuckle 81, which constitutes an elongated piece, internally threaded at both ends 82 and, respectively, 83. If one end, for example 82, is right-hand threaded, the other end 83 is left-hand threaded. In both ends 82 and 83 a threaded, closed eye rod 84 is screwed. The latter is provided with an eye 85. By rotating turnbuckle 81, with eyes 85 of both threaded, closed eye rods 84 directed towards recess 48, penetration in or retraction from recesses 48 occurs. Thus, tightening or slackening of removable long elements 45 takes place. Obviously, in order to insert ice blocks 60 in retaining frames 40, slackening followed by tightening must take place.

A pair of fixed loop handles 90 is firmly secured on upper surface 24 of board 20. Each fixed loop handle 90 is disposed close to each lateral end 28 and is parallel to longitudinal axis of symmetry 21 and perpendicular to transversal axis of symmetry 22. A rope 100, provided with a handle 101, in its middle part, is attached with its ends to pair of holes 29 by knots (not shown).

Each ice-block 60, which is made in a mold, comprises a first and second parallelepiped 61 and, respectively, 62, which form a unitary body. First parallelepiped 61 is larger than second 62, and is dimensioned to fit in a cavity formed by each retaining frame 40. Second parallelepiped 62, which protrudes from first parallelepiped 61, has its transversal cross-section adapted to fit the substantial rectangular contour formed by retainers 49.

Board 20 can be steered by holding onto fixed loop handles 80 and leaning from side to side or by sitting and dragging the rider's feet on the grass.

Rope 100 allows a standing rider to keep his balance, and, by pulling on it and leaning forward, to move the center of gravity to front end 26 of board 20, for steering purposes. Handle 101 can also be used to pull board 20 back up a hill.

A grip opening 102, provided near one of fixed loop handles 80, is used to easily carry board assembly 10.

In another embodiment, a unitary board 20', made of plastic material, has essentially a rectangular shape with a longitudinal and transversal axis of symmetry 21' and, respectively, 22'. Unitary board 20' has an upper and lower surface 24' and, respectively, 25', a front and rear end 26' and, respectively, 27', and a pair of lateral ends 28'. Front and rear-end 26' and 27' are curvilinear, and there is a rounded transition, around the configuration of unitary board 20', between top and lower surfaces 24' and 25'.

In unitary board 20', starting from lower surface 25', a recess 120 is formed. The latter has in plan view an essentially rectangular shape and extends basically over most of the area of lower surface 25'. The axes of symmetry of recess 120 coincide with longitudinal and transversal axes of symmetry 21' and 22' of unitary board 20'. Centrally and parallel to longitudinal axis of symmetry 21', in each of lateral ends 28', starting from recess 120, a rectangular entrance slit 122 is provided. The latter comprises, at each end, an upper part 124 of a corner lap joint 46'.

A pair of removable long elements 45 is used. Each removable long element 45 is adapted to fit with its opposite ends in adjoining ends of opposed rectangular entrance slits 122. Thus, when the pair of removable long elements 45 is in place, two rectangular cavities 126 for lodging pair of first parallelepiped 61 of ice block 60 are formed.

On the exterior surface of each zone delimiting a cavity 126, a retainer 49 is firmly attached to each side of the latter including removable long element 45. Since the four retainers 49 extend inwardly, beyond the edges of cavity 126, a rectangular contour is formed. The latter delimits second parallelepiped 62, and, thus, retains first parallelepiped 61 in cavity 126.

An adjustable locking device 80 is used to keep in position removable long elements 45, which are provided with central recesses 48.

Like in the first described embodiment, unitary board 20' is provided with a pair of holes 29' to which a rope 100 (not shown) is attached.

The method of sliding on grass slopes, using a board having an upper and lower surface and adaptable to use an ice block, comprises the following steps:
  providing the board;
  attaching to the lower surface of the board at least one ice block;
  putting the board on a grass slope; and
  riding the board.

Various modifications can be made without departing from the spirit of this invention or the scope of the appended claims. The embodiments set forth in this disclosure are given as example and are in no way final or binding. In view of the above, it will be seen that several objectives of the invention are basically achieved and other advantages are obtained. As many changes could be made in the above construction without departing from the scope of the invention, it is intended that all matter contained in the above description shall be interpreted as illustrative and not in a limiting sense.

The embodiments of the invention, in which an exclusive property or privilege is claimed, are defined as follows:

1. A board assembly for sliding on grass slopes, comprising in combination, a board having;
  a rectangular shape, with longitudinal and transversal axes of symmetry which intersect at a center of symmetry of said board; and an upper surface, a lower surface, a front and rear ends and a pair of lateral ends, said front and rear ends being curvilinear; and
  a retaining means including
    a pair of longitudinally spaced retaining frames, each retaining frame being configured for securing a block of ice to said board, each retaining frame having, a rectangular shape with a long axis of symmetry parallel to said transversal axis of symmetry and a short axis of symmetry coinciding with said longitudinal axis of symmetry, each retaining frame including
      a pair of parallel short elements parallel to said longitudinal axis of symmetry and a long element parallel to said transversal axis symmetry and proximate to said front and rear end, the former and the latter named elements being fixedly secured to said lower surface; and
    a removable long element extending parallel to said long element and disposed near said transversal axis of symmetry and adapted to fit, with its opposite ends, by corner lap joints, in adjoining ends of said short elements, each said removable long element having a side, directed towards said transversal axis of symmetry, which is provided with a central recess;
    a retainer, fixed on an exterior top surface of each short, long and removable long elements, each retainer extending inwardly beyond an internal edge of each of said named elements to form an overlapping lip for engaging the block of ice; and
    locking means interconnecting the removable long elements of said pair of retaining frames and positioned therebetween, said locking means being adapted to simultaneously move said removable long elements in directions either away from each other or towards each other for respectively securing or releasing the block of ice from said pair of retaining frames.

2. A board assembly for sliding on grass slopes, as defined in claim 1, wherein said locking means includes:
  a turnbuckle, internally threaded at both ends, one end being right-hand threaded, the other end being left-hand threaded;
  threaded, closed eye rods, screwed respectively in each of said internally threaded ends and having eye portions received within said recesses.

3. A board assembly for sliding on grass slopes, as defined in either one of claims 1, or 2, further comprising:
  a pair of fixed loop handles, firmly secured on said upper surface of said board, each fixed loop handle being disposed adjacent to said lateral ends, parallel to said longitudinal axis and perpendicular to said transversal axis.

4. A board assembly for sliding on grass slopes as defined in either of claims 1, or 2, further comprising
  a rope provided with a handle in a middle part and ends formed with knots attached to a pair of holes disposed proximate to said rear end of said board, said pair of holes being located parallel to said transversal axis of symmetry and perpendicular to said longitudinal axis of symmetry.

5. A board assembly for sliding on grass slopes, comprising in combination:
  a unitary board having a rectangular shape with longitudinal and transverse axes of symmetry, upper and lower surfaces, front and rear ends, and a pair of lateral ends, said front and rear ends being curvilinear, a transition between said upper and lower surfaces along a contour of said unitary board being rounded;
  a recess formed in said lower surface, having in bottom view, a rectangular shape extending over most of said lower surface, said recess having axes of symmetry coinciding with said longitudinal and transverse axes of said unitary board;
  a rectangular entrance opening formed in the lower surface between said pair of lateral ends for entry into said recess, said rectangular entrance opening including a pair of extended members at each longitudinally spaced end to form upper parts of a corner lap joint;
  a pair of removable long elements receivable within the rectangular entrance opening, each of which having opposite ends adapted to be selectively receivable below said extended members to form two longitudinally spaced cavities within said recess for receiving blocks of ice, each removable long element having a central recess;

a plurality of retainers fixedly attached to edges of each cavity which are formed by the lower surface and the removable long element, each retainer extending inwardly beyond an edge of said cavity to form a lip for engaging a block of ice received within the cavity; and a locking device interconnecting said removable long elements, said locking device being located between said removable long elements and being adapted to simultaneously move said removable long elements in directions either away from each other or towards each other for respectively securing or releasing the blocks of ice from said cavities.

6. A board assembly for sliding on grass slopes, as defined in claim 5, wherein said locking device includes:

a turnbuckle, internally threaded at both ends, one end being right-hand threaded, the other end being left-hand threaded; threaded, closed eye rods, screwed respectively in each of said ends, and having eye portions received within said recesses.

7. A board assembly for sliding on grass slopes, as defined in either of claims 5 or 6, further comprising:

a pair of fixed loop handles, firmly secured on said upper surface of said unitary board, each fixed loop handle being disposed adjacent to said lateral ends, parallel to said longitudinal axis and perpendicular to said transversal axis.

8. A board assembly for sliding on grass slopes as defined in either of claims 5, 6 or 7, further comprising:

a rope provided with a handle in a middle part and ends formed with knots to a pair of holes disposed proximate to said rear end, of said bound said pair of holes being located parallel to said transversal axis of symmetry and perpendicular to said longitudinal axis of symmetry.

* * * * *